United States Patent
Shima et al.

(10) Patent No.: US 9,835,493 B2
(45) Date of Patent: Dec. 5, 2017

(54) METHOD FOR MEASURING TEMPERATURE OF OBJECT IN ATMOSPHERE HAVING DUST

(71) Applicants: MITSUBISHI MATERIALS CORPORATION, Tokyo (JP); UBE INDUSTRIES, LTD., Yamaguchi (JP); SUMITOMO OSAKA CEMENT CO., LTD., Tokyo (JP); TAIHEIYO CEMENT CORPORATION, Tokyo (JP)

(72) Inventors: Hirokazu Shima, Naka (JP); Yoshiaki Takata, Naka (JP)

(73) Assignees: MITSUBISHI MATERIALS CORPORATION, Tokyo (JP); UBE INDUSTRIES, LTD., Yamaguchi (JP); SUMITOMO OSAKA CEMENT CO., LTD., Tokyo (JP); TAIHEIYO CEMENT CORPORATION, Tokyo (JP)

( * ) Notice: Subject to any disclaimer, the term of this patent is extended or adjusted under 35 U.S.C. 154(b) by 0 days.

(21) Appl. No.: 15/124,475

(22) PCT Filed: Feb. 25, 2015

(86) PCT No.: PCT/JP2015/055325
§ 371 (c)(1),
(2) Date: Sep. 8, 2016

(87) PCT Pub. No.: WO2015/141412
PCT Pub. Date: Sep. 24, 2015

(65) Prior Publication Data
US 2017/0023411 A1 Jan. 26, 2017

(30) Foreign Application Priority Data
Mar. 17, 2014 (JP) .................... 2014-053172

(51) Int. Cl.
*F27B 7/20* (2006.01)
*G01J 5/00* (2006.01)
(Continued)

(52) U.S. Cl.
CPC .............. *G01J 5/0003* (2013.01); *F27B 7/20* (2013.01); *F27B 7/42* (2013.01); *G01J 5/0044* (2013.01);
(Continued)

(58) Field of Classification Search
CPC ...... F27B 7/20; F27B 7/42; F27D 2019/0012; F27D 2019/0015; G01J 2005/0048;
(Continued)

(56) References Cited

U.S. PATENT DOCUMENTS 4,172,383 A 10/1979 Iuchi
2004/0086295 A1 5/2004 Peng et al.
(Continued)

FOREIGN PATENT DOCUMENTS

JP 61-39604 9/1986
JP 7-174634 7/1995
(Continued)

OTHER PUBLICATIONS

International Preliminary Report on Patentability issued in International Patent Application No. PCT/JP2015/055325, dated Sep. 20, 2016.

*Primary Examiner* — Mark R Gaworecki
(74) *Attorney, Agent, or Firm* — Greenblum & Berstein, P.L.C.

(57) ABSTRACT

A first radiance meter that is provided so as to face an object in an atmosphere in which there is dust and measures the radiance of the object and a second radiance meter that is provided so as not to oppose the object and measures the radiance of the dust between the object and the first radiance meter are used to measure the temperature of the object on (Continued)

the basis of the object radiance that has been measured by the first radiance meter and the radiance of the dust between the object and the first radiance meter that has been measured by the second radiance meter.

19 Claims, 7 Drawing Sheets

(51) Int. Cl.
    *F27B 7/42*     (2006.01)
    *G01J 5/60*     (2006.01)
    *F27D 19/00*     (2006.01)

(52) U.S. Cl.
    CPC ........ *G01J 5/60* (2013.01); *F27D 2019/0012* (2013.01); *F27D 2019/0015* (2013.01); *G01J 2005/0048* (2013.01); *G01J 2005/607* (2013.01)

(58) Field of Classification Search
    CPC .. G01J 2005/607; G01J 5/0003; G01J 5/0044; G01J 5/60
    See application file for complete search history.

(56) References Cited

U.S. PATENT DOCUMENTS

| | | | |
|---|---|---|---|
| 2004/0164235 A1* | 8/2004 | Miller | G01W 1/00 250/265 |
| 2005/0012035 A1* | 1/2005 | Miller | H01J 40/14 250/226 |
| 2011/0058167 A1* | 3/2011 | Knox | G01N 15/06 356/338 |
| 2012/0183013 A1* | 7/2012 | Stein | G01J 5/60 374/130 |

FOREIGN PATENT DOCUMENTS

| | | |
|---|---|---|
| JP | 2000-111398 | 4/2000 |
| JP | 2001-249049 | 9/2001 |
| JP | 2004-252431 | 9/2004 |
| JP | 2013-210259 | 10/2013 |

* cited by examiner 10a,10b: CEMENT PRODUCTION EQUIPMENT
11: ROTARY KILN
20: FIRST RADIANCE METER
30: OBJECT TO BE HEATED (CLINKER)

METHOD FOR MEASURING TEMPERATURE OF OBJECT IN ATMOSPHERE HAVING DUST

TECHNICAL FIELD

The present invention relates to a method for measuring a temperature of an object in an atmosphere where dust presents, e.g., an object to be heated or the like having a high temperature in a furnace where dust presents such as a rotary kiln provided in a cement production equipment. This International Application which claims priority based on Japanese Patent Application No. 2014-053172 filed on Mar. 17, 2014, and all contents of Japanese Patent Application No. 2014-053172 are applied to this International Application.

BACKGROUND ART

Generally, in a furnace which has high dust concentration and where a continuous treatment is performed like a rotary kiln provided in a cement production equipment, a radiation thermometer or the like which can measure a temperature in a contactless manner is used for temperature measurement of an object to be heated. This radiation thermometer is widely used in a baking furnace other than the rotary kiln or high-temperature processes.

However, the radiation thermometer has a problem that presence of dust between the object to be heated which is a measurement target and an observer leads to an influence of attenuation of radiation light caused by the dust and the radiation light from the dust itself, and a temperature of the object to be heated cannot be accurately measured. A two-color thermometer known as a non-contact thermometer obtains a temperature from a radiance ratio at two wavelengths, and this two-color thermometer can ignore an influence of attenuation of the radiation light caused by the dust which does not change the radiance ratio, but it cannot ignore an influence of the radiation light from the dust which changes the radiance ratio.

The above-described problem according to the temperature measurement in the furnace having high dust concentration can likewise occur in other baking furnaces than the cement firing furnace as a matter of course. To eliminate such a problem, for example, a temperature measuring method which enables assuredly measuring a liquid level temperature of molten slag in a furnace having high soot concentration is disclosed (see, e.g., Patent Literature 1). According to this temperature measuring method, of radiant light radiated from a liquid level of molten slag accommodated in a furnace, radiant light in an intermediate-infrared region or a far-infrared region is concentrated on a photoelectric element, an output voltage having an amplitude corresponding to intensity of the incoming radiant light is generated from the photoelectric element, and the liquid level temperature of the molten slag is determined on the basis of this output voltage value and Planck's law of radiation. Further, according to this temperature measuring method, radiant lights having two or more different wavelengths are used.

Furthermore, there is disclosed a flame light emission measuring apparatus using a condensing optical system in local measurement which is generally adopted to measure a fine structure of a flame (see, e.g., Patent Literature 2). This measuring apparatus is characterized by having a condensing optical system constituted of a single optical system which condenses light emission from a plurality of measuring points of a flame onto corresponding condensing points on a condensing surface and a light emission measuring system in which the light emission from the plurality of measuring points condensed on the condensing points respectively is measured.

PRIOR ART REFERENCES

Patent Documents

Patent Document 1: Japanese Unexamined Patent Application Publication No. 2001-249049 (claim 1, claim 2, claim 3, paragraph [0001])

Patent Document 2: Japanese Unexamined Patent Application Publication No. 2000-111398 (claim 1, paragraph [0003])

SUMMARY OF THE INVENTION

Problem to be Solved by the Invention

However, according to the method disclosed in Patent Literature 1 of the prior art, dust as a target has a particle diameter of 1 to 2 μm, and it is much finer than dust in the cement firing furnace and the like. Thus, this method cannot be directly applied to the dust in the cement firing furnace and the like and used for temperature measurement of clinkers. Likewise, it cannot be applied when a particle diameter of dust is not fine as described above even in case of measuring a temperature of a solid matter, a liquid, or the like flowing through a duct such as an object to be heated present in high-temperature furnaces (heating, smelting, refinement, firing, reactions, and others) other than a rotary kiln or a heat exchange tube in a boiler as well as a heat transfer pipe or a partition wall in a heat exchanger. Further, like the local measurement using the condensing optical system disclosed in Patent Literature 2, since a technique of simply reducing a volume to be measured cannot eliminated the effect of dust on an optical path and others, it cannot be directly applied to the method for measuring a temperature and others of clinkers in the cement firing furnace or the like having high dust concentration.

Thus, there has been demanded development of a measuring method which can be applied to measurement of a clinker temperature and others of the cement firing furnace and is more accurate than a conventional method using two-color thermometer.

It is an object of the present invention to provide a measuring method which enables more accurately measuring an object in an atmosphere where dust is present, e.g., an object to be heated having a high temperature in a furnace where dust is present, e.g., a rotary kiln provided in a cement production equipment.

Means for Solving Problem

According to a first aspect of the present invention, there is provided a method for measuring a temperature of an object, the method using a first radiance meter which is provided to face the object in an atmosphere where dust is present and measures a radiance of the object and a second radiance meter which is provided without facing the object and measures a radiance of the dust present between the object and the first radiance meter so that a temperature of the object is measured from the radiance of the object measured by the first radiance meter and the radiance of the dust present between the object and the first radiance meter measured by the second radiance meter.

According to a second aspect of the present invention, there is provided the invention based on the first aspect which is characterized in that the radiance of the dust is measured at two wavelengths.

According to a third aspect of the present invention, there is provided the invention based on the first or second aspect which is characterized in that, at the time of measuring the radiance of the dust, the measurement is performed in a state where a temperature of a wall surface facing the second radiance meter is lowered by cooling means.

According to a fourth aspect of the present invention, there is provided the invention based on the first to third aspects which is characterized in that, at the time of measuring the radiance of the dust, an emissivity of the wall surface facing the second radiance meter is set to 0.9 or more.

According to a fifth aspect of the present invention, there is provided the invention based on the fourth aspect which is characterized in that, at the time of measuring a radiance of the dust, a blackbody cavity is provided in the wall surface facing the second radiance meter.

According to a sixth aspect of the present invention, there is provided the invention based on the first to fifth aspects characterized in that the radiance of the object is measured at two wavelengths.

According to a seventh aspect of the present invention, there is provided the invention based on the first to sixth aspects characterize in that a plurality of radiance meters are used as the second radiance meter to measure two or more radiances of the dust, and the measurement is made from the radiance of the object measured by the first radiance meter and the two or more radiances of the dust present between the object and the first radiance meter and measured by the plurality of second radiance meters.

EFFECT OF THE INVENTION

The method according to the first aspect of the present invention uses the first radiance meter which is provided to face an object in an atmosphere where dust is present and measures a radiance of the object and the second radiance meter which is provided without facing the object and measures a radiance of dust present between the object and the first radiance meter. This measuring method adopts a method which uses radiance meters different from a radiance meter which measures the radiance of the object and measures the radiance of the dust from other angles. Consequently, the effect of the dust at the time of measuring a temperature of the object can be reflected as a more accurate numerical value, and the accuracy can be further improved.

According to the method based on the second aspect of the present invention, the radiance of the dust is measured at two wavelengths. As the radiance of the dust is measured at the two wavelengths, a later-described load (Ap·N) of the dust as well as a temperature and concentration of the dust can be more accurately measured.

According to the method based on the third aspect of the present invention, the radiance of the dust is measured in a state where a temperature of the wall surface facing the second radiance meter is lowered by the cooling means. Consequently, the effect of radiation from the wall surface can be lowered, a measurement accuracy for the radiance of the dust can be improved, and a measurement accuracy for an object temperature can be enhanced.

According to the method based on the fourth aspect of the present invention, at the time of measuring the radiance of the dust, setting an emissivity of the wall surface facing the second radiance meter to 0.9 or more enables to reduce the effect that radiation light emitted from a high-temperature object other than the dust, e.g., a burner or a furnace wall is reflected on the wall surface and enters the radiance meters, improve the measurement accuracy for the radiance of the dust, and further enhance the measurement accuracy for an object temperature.

According to the method based on the fifth aspect of the present invention, at the time of measuring the radiance of the dust, providing the blackbody cavity in the wall surface facing the second radiance meter enables to reduce the effect that the radiation light emitted from a high-temperature object other than the dust, e.g., a burner or a furnace wall is reflected on the wall surface and enters the radiance meters, improve the measurement accuracy for the radiance of the dust, and further enhance the measurement accuracy for an object temperature.

According to the method based on the sixth aspect of the present invention, measuring the radiance of the object is measured at two wavelengths, a temperature can be measured by giving an emissivity ratio of the object at the two wavelengths rather than directly giving an emissivity of the object, and the effect that the radiation light emitted from a high-temperature object other than the object which is a temperature measurement target is reflected on the object and enters the radiance meters can be suppressed, and the accuracy for temperature measurement can be improved. Likewise, as regards the radiance of the dust measured by the second radiance meter, when the radiance of the object is measured at two wavelengths, it is possible to suppress the effect that the radiation light emitted from a high-temperature object other than the dust, e.g., a burner or a furnace wall is reflected on the wall surface in the furnace facing the second radiance meter or scattered by the dust itself and enters the second radiance meter.

According to the method based on the seventh aspect of the present invention, as the second radiance meter for use in measurement of the radiance of the dust, a plurality of radiance meters are used, two or more radiances of the dust measured by them are reflected in the radiance of the object measured by the first radiance meter, and an object temperature is measured. Consequently, as compared with a case where one radiance of the dust measured by the single second radiance meter is used, a temperature of the object can be more accurately measured.

BEST MODE(S) FOR CARRYING OUT THE INVENTION

Figure 1:
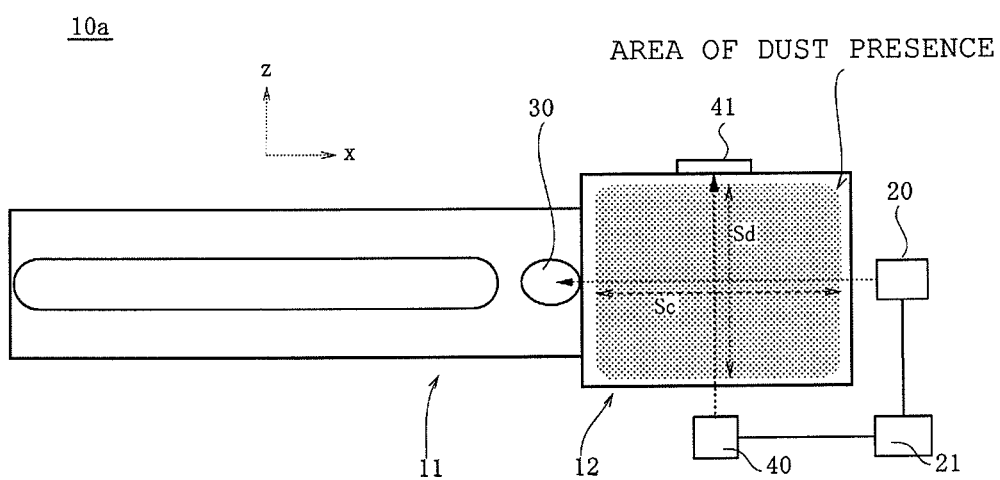
FIG. 1 is a top view schematically showing an outline of a cement production equipment used in a first embodiment according to the present invention.

Modes for carrying out the present invention will now be described with reference to the drawings. It is to be noted that like reference numerals denote like components and others in FIG. 1 to FIG. 3. It is to be noted that, in this specification, dust means a dust group formed when a plurality of dust particles suspended in a gas gather with predetermined concentration, and radiance, an absorption coefficient, a scattering coefficient, absorption efficiency, scattering efficiency, and concentration of the dust mean values of the dust group in an area of dust presence, respectively. Furthermore, the dust particle means each dust particle included in the dust group, and an emissivity, density, a geometrical cross section, and a radius of the dust particle means average values of individual dust particles included in the dust group in the area of dust presence. A dust temperature means an average value of temperatures of the individual dust particles included in the dust group in the area of dust presence.

<First Embodiment>

A measuring method according to a first embodiment of the present invention will now be described on the basis of an example where a temperature of an object to be heated (a clinker) in a high-temperature state is measured in the presence of high-concentration dust in a rotary kiln provided in a cement production equipment.

<Apparatus>

Figure 3:
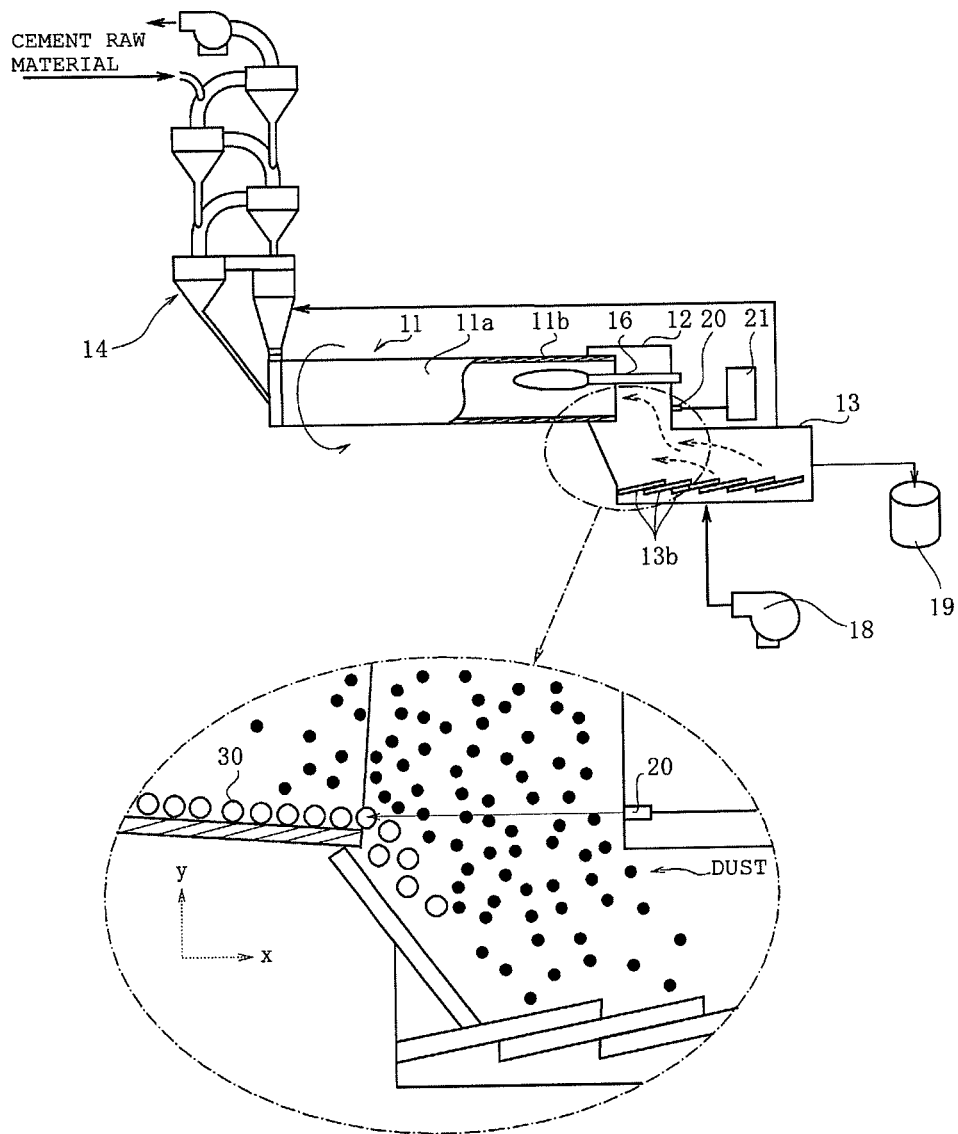
FIG. 3 is a side elevation schematically showing an outline of a cement production equipment used in embodiment according to the present invention.

An apparatus shown in FIG. 3 is an example of a cement production equipment preferable for carrying out the measuring method according to the present invention, and this cement production equipment 10a includes a rotary kiln 11 and a kiln hood 12 connected with the rotary kiln 11. The rotary kiln 11 is configured to fire a cement raw material to manufacture a clinker, and a preheater 14 is provided on the upstream side of the rotary kiln 11. The preheater 14 preheats the cement raw material pulverized by a non-illustrated raw material mill to a predetermined temperature so that the cement raw material can be readily fired by the rotary kiln 11 at a later step. The preheater 14 is constituted by mounting many cyclones on a multistory steel frame stand. The rotary kiln 11 has a laterally-facing cylindrical kiln shell 11a which is slightly downwardly inclined toward the downstream side, and a burner 16 which faces a kiln tail is provided at an end portion of the kiln shell 11a on the downstream side. The cement raw material is preliminary fired while flowing down through each cyclone of the preheater 14, and then the cement raw material flows into the kiln tail portion of the rotary kiln 11. A refractory 11b is applied to an inner wall surface of the kiln shell 11a. The kiln shell 11a fires the cement raw material supplied from the preheater 14 by burner heating, which uses a heavy oil or pulverized coal as a fuel, to provide a clinker while rotating in a circumferential direction (in a periaxial direction), and carries it to the burner side.

The kiln hood 12 has an upstream end connected to a burner side end portion of the rotary kiln 11 and a downstream end connected to a clinker cooler 13. The clinker of approximately 1200 to 1500° C. which is discharged from the burner side end portion of the rotary kiln 11 and supplied to the upstream side of the kiln hood 12 is cooled by air of 20 to 30° C. supplied from a cooling fan 18 connected to the clinker cooler 13. A plurality of plates 13b are laid on a floor surface of this clinker cooler 13 from the upstream side toward the downstream side, and the lump-like clinker discharged from the burner side end portion of the rotary kiln 11 falls onto the plates 13b on the upstream side. Each of the plurality of plates 13b reciprocates in a front-and-back direction to sequentially guide the clinker placed on an upper surface thereof to the plate 13b on the downstream side. Thus, a clinker layer which is carried on the plurality of plates 13b from the upstream side toward the downstream side is formed in the clinker cooler 13, and the air supplied from the cooling fan 18 passes between the plurality of plates 13b from the lower side of the plurality of plates 13b to cool the clinker. It is to be noted that the cooled clinker is discharged from the downstream side end portion of the clinker cooler 13, and the clinker discharged from the downstream side end portion is stored in a clinker silo 19. Moreover, the air which is supplied from the cooling fan 18, passes between the plurality of plates 13b, and further passes through the clinker layer to cool the clinker flows toward the upstream side above the clinker layer and is supplied to the rotary kiln 11 as combustion air in the burner 16 as indicated by arrows of a broken line in FIG. 3.

Additionally, as shown in FIG. 1 and FIG. 3, in this cement production equipment 10a, to carry out the measuring method according to the present invention, a first radiance meter 20 which measures a radiance of an object to be heated 30 is provided on an outer side of a wall surface of the kiln hood 12 facing the downstream side end portion of the kiln shell 11a and at a position facing the object to be heated 30. That is, the first radiance meter 20 is provided so that the object to be heated 30 is present on an optical axis of the first radiance meter 20. As an example of an apparatus that measures a radiance, in addition to a radiance meter or a spectral radiance meter, there is an apparatus which is a combination of a radiation thermometer and an arithmetic apparatus and converts a temperature measurement value of the radiation thermometer into luminance by using Planck's formula which is a later-described Expression (2). Further, considering a case where the radiance is measured at two different wavelengths, it is desirable for the first radiance meter 20 and later-described second radiance meters 40, 40a, and 40b to be configured to simultaneously measure the radiance at a plurality of wavelengths, respectively. However, even a wavelength switching type radiance meter can measure the radiance at different two wavelengths substantially simultaneously by hastening switching timing.

On the other hand, as shown in FIG. 1, the second radiance meter 40 which measures a radiance of dust present between the object to be heated 30 and the first radiance meter 20 is provided on the outer side of the side wall surface of the kiln hood 12, i.e., a position which does not face the object to be heated 30. That is, as regards a positional relationship between the first radiance meter 20 and the second radiance meter 40, the second radiance meter 40 is provided at a position where an optical axis of the second radiance meter 40 is not parallel to at least an optical axis of the first radiance meter 20. As a position at which the second radiance meter 40 is provided gets closer to a position at which the optical axis of the second radiance meter 40 is parallel to the optical axis of the first radiance meter 20, for example, radiation light from the object to be heated 30 enters the second radiance meter 40, and highly accurate measurement of the radiance of the dust, which is an original goal, becomes difficult in some situations. When the second radiance meter 40 is provided in this way to perform measurement and gauging, an accurate temperature of the object to be heated 30 can be measured while eliminating the effect of dust. It is desirable to set a position at which the second radiance meter 40 is installed in a height direction y to a position at which the optical axis of this second radiance meter 40 crosses the optical axis of the first radiance meter 20. Furthermore, it is desirable to set a position at which the second radiance meter 40 is installed in a lateral direction x (an optical axis direction of the first radiance meter 20) to a position running through an intermediate point ($S_c/2$) in a lateral direction x (the optical axis direction of the first radiance meter 20) in an area of dust presence. Consequently, an average dust temperature and dust concentration in the area of dust presence can be reflected in the measurement of a temperature of the object to be heated, and the measurement accuracy can be further improved.

Moreover, it is desirable to hold the wall surface facing the second radiance meter 40 (the wall surface present on the optical axis of the second radiance meter 40) at a temperature lower than a temperature of a surrounding wall surface by the cooling means 41. Consequently, the effect of the radiation light entering the second radiance meter 40 from the wall surface can be eliminated, and the radiance of the dust can be more accurately measured. In general, in the cement equipment, although a temperature of the inner wall surface in the kiln hood 12 increases to approximately 1500° C., it is desirable to perform the measurement in a state where the temperature of the wall surface is lowered to a temperature of 300 to 500° C. Although the cooling means 41 is not restricted in particular, for example, as shown in FIG. 4(a), there is a water cooled tube or an air cooled tube buried immediately below the wall surface from the outer side. Additionally, for example, as shown in FIG. 4(b), a cylindrical concave portion which has an opening end in the wall surface and protrudes toward the outer side may be provided, and the water cooled tube or the air cooled tube may be wound on an outer periphery of the concave portion. It is to be noted that, when the concave portion or the like is provided at a position facing the second radiance meter 40 as shown in FIG. 4(b), the wall surface facing the second radiance meter 40 means an inner wall surface of the concave portion. Consequently, the effect of radiation from the wall surface can be reduced, the measurement accuracy for the radiance of the dust can be improved, and hence the measurement accuracy for a temperature of the object to be heated can be further enhanced.

Further, when radiation light emitted from a flame of the burner 16 or the inner wall of the kiln hood 12 is reflected on the wall surface and enters the second radiance meter 40, the measurement accuracy is lowered. Thus, it is desirable to control an emissivity of the wall surface to 0.9 or more so that the effect of the reflection of the radiation light can be reduced. Consequently, the measurement accuracy for the radiance of the dust can be improved, and hence the measurement accuracy for a temperature of the object to be heated can be further enhanced. It is to be noted that, as a method for controlling the emissivity to 0.9 or more, when substances having emissivity of 0.9 or more, for example, a metal having an oxidized surface, a metal having fine irregularities on a surface thereof, a metal having a blackbody coating material applied thereto, a refractory, and the like are used and placed on the wall surface, the wall surface can be made of a material having desired emissivity.

Figure 4:
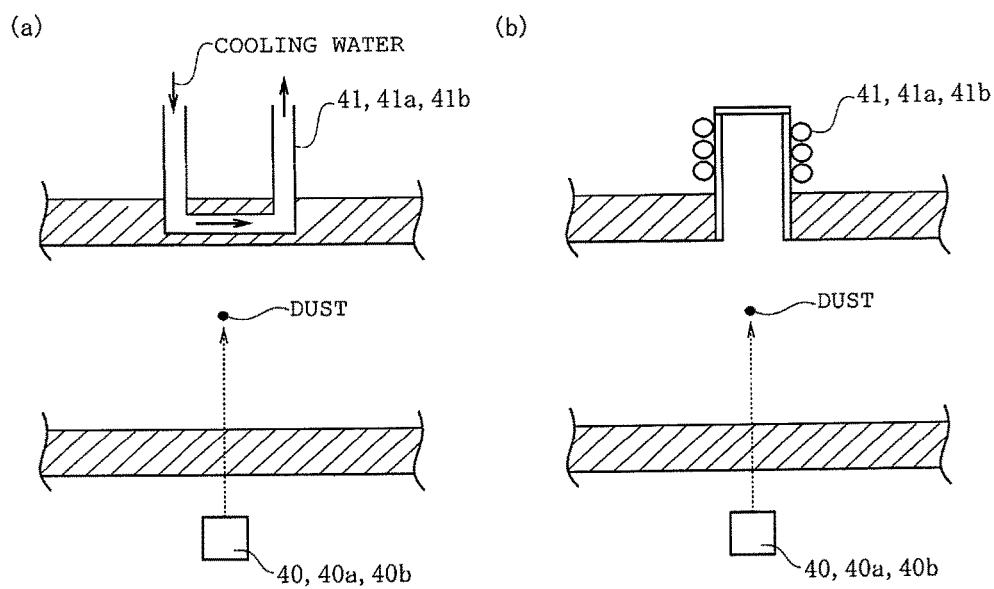
FIG. 4 is a schematic view showing an example of cooling means provided in the cement production equipment used in embodiments according to the present invention.
Figure 5:
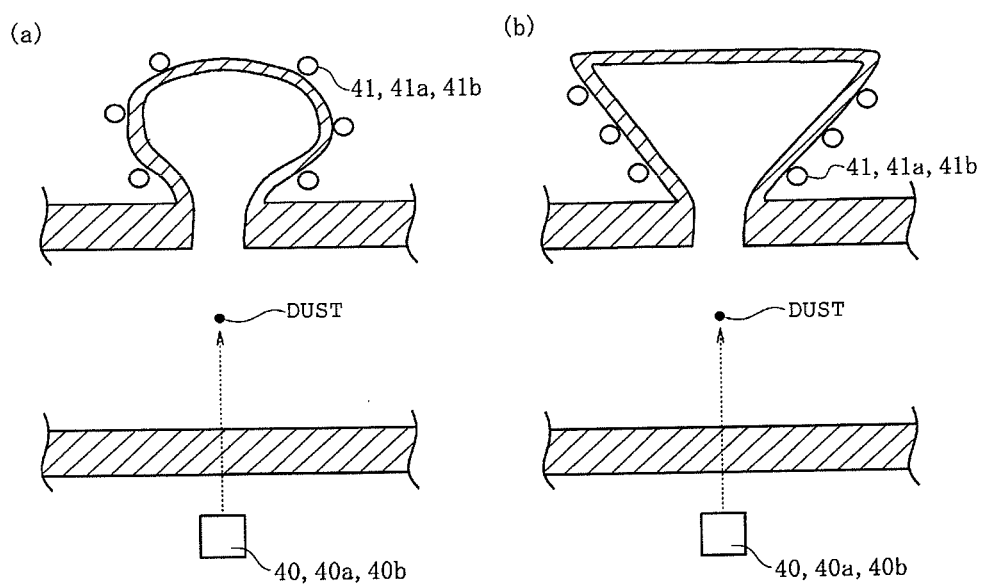
FIG. 5 is a schematic view showing an example of a blackbody cavity provided in the cement production equipment used in embodiments according to the present invention.

Furthermore, in place of using the specific material, a blackbody cavity using the wall surface as an opening end may be installed. The blackbody cavity is, e.g., a spherical or conical cavity as shown in FIG. 5(a) or FIG. 5(b) or a cavity having a shape provided by further elongating a cylindrical shape as shown in FIG. 4 (b) to realize a blackbody, and the radiation light which has entered the cavity repeats reflection or absorption in the cavity and attenuates when the blackbody cavity is provided on the wall surface facing the second radiance meter 40. Thus, the radiation light which has entered the cavity can be prevented from again being discharged into the kiln hood 12 from the opening end as much as possible, and a high emissivity of 0.99 or more can be provided. Consequently, since it is possible to greatly reduce the effect that the radiation light emitted from the flame of the burner 16 or the inner wall of the kiln hood 12 is reflected on the wall surface, the measurement accuracy for the radiance of the dust can be improved, and the measurement accuracy for a temperature of the object to be heated can be further enhanced. Moreover, to further reduce the effect of radiation from the blackbody cavity, the cooling means can be also used. That is, for example, it is preferable to install the water cooled tube or the air cooled tube on an outer surface of the black cavity and perform the measurement in a state where the inner wall surface of the blackbody cavity is lowered to a temperature of 300 to 500° C.

<Measurement of Radiance of Dust Present Between Object to be Heated and Radiance Meter>

In the measuring method according to the first embodiment of the present invention, a radiance $L'_{d,\lambda}$ of the dust at a wavelength $\lambda$ is first measured from the second radiance meter 40 provided in the cement production equipment 10a. The radiance $L'_{d,\lambda}$ of the dust measured by the second radiance meter 40 is represented by the following Expression (1) when self-absorption and self-scattering caused due to the dust are taken into consideration.

[Expression 1]

$$L'_{d,\lambda} = \frac{a_{p,\lambda} L_{d,\lambda}}{a_{p,\lambda} + \sigma_{p,\lambda}} [1 - \exp\{-(a_{p,\lambda} + \sigma_{p,\lambda})s_d\}] \quad (1)$$

In Expression (1), $L_{d,\lambda}$ is a radiance of the dust, and $a_{p,\lambda}$ is an absorption coefficient of the dust, $\sigma_{p,\lambda}$ is a scattering coefficient of the dust, and $s_d$ is a length of the second radiance meter 40 in the optical axis direction in the area of dust presence.

It is to be noted that the radiance $L_{d,\lambda}$ of the dust is obtained from a dust temperature $T_d$ based on Planck's formula which is the following Expression (2), and the absorption coefficient $a_{p,\lambda}$ of the dust and the scattering coefficient $\sigma_{p,\lambda}$ of the dust are represented by the following Expression (3) and Expression (4), respectively.

[Expression 2]

$$L_\lambda = \frac{2C_1}{\lambda^5} \frac{1}{\exp\left(\frac{C_2}{\lambda T}\right) - 1} \quad (2)$$

In Expression (2), $C_1$ is a first radiation constant ($5.95 \times 10^{-17}$ W·m²), and $C_2$ is a constant of a second radiation constant ($1.44 \times 10^2$ m·K).

[Expression 3]

$$a_{p,\lambda} = Q_{abs,\lambda} A_p N \quad (3)$$

[Expression 4]

$$\sigma_{p,\lambda} = Q_{sca,\lambda} A_p N \quad (4)$$

In Expression (3) and Expression (4), $Q_{abs,\lambda}$ and $Q_{sca,\lambda}$ are absorption efficiency of the dust and the scattering efficiency of the dust respectively, and each of them is given as a constant or a function of an emissivity $\xi_\lambda$ of a dust particle. Additionally, $A_p$ is a geometrical cross section of the dust particle ($\pi r_p^2$ and $r_p$ are radii of the dust particle), and N is particle density (quantity/m$^3$) of the dust.

Here, Expression (1') provided by substituting Expression (3) and Expression (4) in Expression (1) is shown below.

[Expression 5]

$$L'_{d,\lambda} = \frac{Q_{abs,\lambda} L_{d,\lambda}}{Q_{abs,\lambda} + Q_{sca,\lambda}}[1 - \exp\{-(Q_{abs,\lambda} + Q_{sca,\lambda})A_p N s_d\}] \quad (1')$$

Based on Expression (1'), a ratio ($L'_{d,\lambda 1}/L'_{d,\lambda 2}$) of radiances $L'_{d,\lambda 1}$ and $L'_{d,\lambda 2}$ of the dust measured at two wavelengths, i.e., wavelengths $\lambda_1$ and $\lambda_2$ by the second radiance meter 40 is represented by the following Expression (5).

[Expression 6]

$$\frac{L'_{d,\lambda 1}}{L'_{d,\lambda 2}} = \quad (5)$$

$$\frac{Q_{abs,\lambda 1}(Q_{abs,\lambda 2} + Q_{sca,\lambda 2})L_{d,\lambda 1}}{Q_{abs,\lambda 2}(Q_{abs,\lambda 1} + Q_{sca,\lambda 1})L_{d,\lambda 1}} \frac{1 - \exp\{-(Q_{abs,\lambda 1} + Q_{sca,\lambda 1})A_p N s_d\}}{1 - \exp\{-(Q_{abs,\lambda 2} + Q_{sca,\lambda 2})A_p N s_d\}} \approx$$

$$\frac{\xi_{\lambda 1} L_{d,\lambda 1}}{\xi_{\lambda 2} L_{d,\lambda 2}}$$

Based on Expression (5), a ratio ($L_{d,\lambda 1}/L_{d,\lambda 2}$) of the radiances $L_{d,\lambda 1}$ and $L_{d,\lambda 2}$ of the dust is calculated from a ratio ($\xi_{\lambda 1}/\xi_{\lambda 2}$) of an emissivity $\xi_{\lambda 1}$ of the dust particle at the wavelength $\lambda_1$ and an emissivity $\xi_{\lambda 2}$ of the dust particle at the wavelength $\lambda_2$.

On the other hand, an approximate expression of the following Expression (6) which can obtain a temperature T from the ratio ($L_{d,\lambda 1}/L_{d,\lambda 2}$) of the radiances at two wavelengths, i.e., the wavelengths $\lambda_1$ and $\lambda_2$ is derived from Planck's formula of Expression (2). Further, a value of $L_{d,\lambda 1}/L_{d,\lambda 2}$ is substituted in this Expression (6) to obtain a dust temperature $T_d$.

[Expression 7]

$$T = \frac{C_2(1/\lambda_2 - 1/\lambda_1)}{\ln(L_{\lambda 1}/L_{\lambda 2}) + 5 \cdot \ln(\lambda_1/\lambda_2)} \quad (6)$$

Then, based on Expression (2), the radiances $L_{d,\lambda 1}$ and $L_{d,\lambda 2}$ of the dust at the wavelength $\lambda_1$ and the wavelength $\lambda_2$ can be obtained by using this dust temperature $T_d$.

Furthermore, when either radiance $L_{d,\lambda 1}$ or $L_{d,\lambda 2}$ is substituted in the following Expression (7) provided by modifying Expression (1'), $A_p \cdot N$ can be obtained. Moreover, an average value of $A_p \cdot N$ obtained by substituting the radiances $L_{d,\lambda 1}$ and $L_{d,\lambda 2}$ in Expression (7) respectively may be used.

[Expression 8]

$$A_p \cdot N = -\frac{\ln\left(1 - \frac{L'_{d,\lambda}}{L_{d,\lambda}} \frac{Q_{abs,\lambda} + Q_{sca,\lambda}}{Q_{abs,\lambda}}\right)}{(Q_{abs,\lambda} + Q_{sca,\lambda})s_d} \quad (7)$$

Moreover, since $A_p$ can be obtained by giving a radius $r_p$ of the particle diameter, N can be obtained, and dust concentration $C_d$ is also obtained based on the following Expression (8). It is to be noted that when the radius $r_p$ of the dust particle is not clear or when it varies depending on situations, the accurate radius $r_p$ of the dust particle cannot be given, and the accurate dust concentration $C_d$ cannot be obtained, but measurement values of a temperature of the object to be heated or a temperature of the dust which are the goal in this method are not affected, and $A_p \cdot N$ can be considered to correspond to a load of the dust and can be exploited in, e.g., control of the furnace.

[Expression 9]

$$C_d = N\frac{273.15}{T_g}\frac{4}{3}\pi r_p^3 \rho \quad (8)$$

In Expression (8), $T_g$ is a gas temperature (K) in an area of dust presence, and $\rho$ is density of the dust particles. It is to be noted that this Expression (8) is provided by converting N representing the number of particles per gas unit volume in the area of gas presence at an actual gas temperature into a particle mass with the use of the density of the particle after correction to 0° C. and determining a resultant as dust concentration.

<Measurement of Radiance and Temperature of Object to be Heated in Presence of Dust>

Aside from the measurement of the radiance $L'_{d,\lambda}$ of the dust using the second radiance meter 40, a radiance $L'_{c,\lambda}$ of the object to be heated 30 at the wavelength $\lambda_1$ or the wavelength $\lambda_2$ is measured by using the first radiance meter 20. Considering attenuation due to absorption and scattering of the dust and the radiance from the dust, this radiance $L'_{c,\lambda}$ of the object to be heated 30 is represented by the following Expression (9). A first term on the right side in the following Expression (9) represents a radiance from the object to be heated 30 when the attenuation due to absorption and scattering of the dust is taken into consideration, and a second term on the right side represents a radiance from the dust when self-absorption and self-scattering due to the dust are taken into consideration.

[Expression 10]

$$L'_{c,\lambda} = \varepsilon_{c,\lambda}\exp\{-(a_{p,\lambda} + \sigma_{p,\lambda})s_c\} + \quad (9)$$

$$\frac{a_{p,\lambda} L_{d,\lambda}}{a_{p,\lambda} + \sigma_{p,\lambda}}[1 - \exp\{-(a_{p,\lambda} + \sigma_{p,\lambda})s_c\}]$$

In Expression (9), $\varepsilon_{c,\lambda}$ is an emissivity of the object to be heated 30, $L_{c,\lambda}$ and $L_{d,\lambda}$ are radiances of the object to be heated 30 and the dust respectively, $a_{p,\lambda}$ is an absorption coefficient of the dust, $\sigma_{p,\lambda}$ is a scattering coefficient of the dust, and $s_c$ is a length of the first radiance meter 20 in the optical axis direction in the area of dust presence.

Moreover, the radiance $L_{c,\lambda}$ of the object to be heated 30 and the radiance $L_{d,\lambda}$ of the dust are obtained from a temperature $T_c$ of the object to be heated 30 and a dust temperature $T_d$ based on Planck's formula of Expression (2), and the absorption coefficient $a_{p,\lambda}$ of the dust and the scattering coefficient $\sigma_{p,\lambda}$ of the dust are represented by Expression (3) and Expression (4) respectively.

Here, Expression (9') provided by substituting Expression (3) and Expression (4) in Expression (9) is shown below.

[Expression 11]

$$L'_{c,\lambda} = \varepsilon_{c,\lambda} L_{c,\lambda} \exp\{-(Q_{abs,\lambda} + Q_{sca,\lambda})A_p N s_c\} + \frac{Q_{abs,\lambda} L_{d,\lambda}}{Q_{abs,\lambda} + Q_{sca,\lambda}}[1 - \exp\{-(Q_{abs,\lambda} + Q_{sca,\lambda})A_p N s_c\}] \quad (9')$$

Additionally, when Expression (9') is modified, the following Expression (10) is derived.

[Expression 12]

$$L_{c,\lambda} = \frac{1}{\varepsilon_{c,\lambda}} \left[ \frac{L'_{c,\lambda} - \frac{Q_{abs,\lambda} L_{d,\lambda}}{Q_{abs,\lambda} + Q_{sca,\lambda}}}{\exp\{-(Q_{abs,\lambda} + Q_{sca,\lambda})A_p N s_c\}} + \frac{Q_{abs,\lambda} L_{d,\lambda}}{Q_{abs,\lambda} + Q_{sca,\lambda}} \right] \quad (10)$$

Further, when $T_d$ obtained from the radiance $L'_{c,\lambda}$ of the object to be heated 30 measured at the wavelength $\lambda_1$ or the wavelength $\lambda_2$ by first radiance meter 20 and the radiances $L'_{d,\lambda 1}$ and $L'_{d,\lambda 2}$ of the dust measured at the two wavelengths, i.e., the wavelengths $\lambda_1$ and $\lambda_2$ by the second radiance meter 40 based on Expression (5) and Expression (6), the radiance $L_{d,\lambda}$ of the dust at the wavelength $\lambda_1$ or the wavelength $\lambda_2$ used in the measurement of the first radiance meter 20 obtained from Expression (2), and $A_p \cdot N$ obtained from Expression (7) are substituted in Expression (10), the radiance $L_{c,\lambda}$ of the object to be heated 30 can be obtained.

It is to be noted that, as the wavelength at which the radiance $L'_{c,\lambda}$ of the object to be heated 30 is measured by the first radiance meter 20, using one of the wavelengths $\lambda_1$ and $\lambda_2$ when the radiance $L'_{d,\lambda}$ of the dust is measured by the second radiance meter 40 is simple and hence desirable, but any other wavelength $\lambda_3$ may be used as long as the absorption coefficient $a_{p,\lambda}$ of the dust and the scattering coefficient $\sigma_{p,\lambda}$ of the dust can be additionally obtained. In such a case, the radiance $L_{d,\lambda}$ of the dust which is substituted in Expression (10) could be obtained by using $T_d$ and the wavelength $\lambda_3$ in Expression (2).

Furthermore, when this radiance $L_{c,\lambda}$ of the object to be heated 30 is substituted in the following Expression (11) which is an inverse function of Planck's formula of Expression (2), the temperature $T_c$ of the object to be heated 30 can be obtained.

[Expression 13]

$$T = \frac{C_2}{\lambda \ln\left(\frac{2C_1}{\lambda^5 L} + 1\right)} \quad (11)$$

It is to be noted that, at the time of measuring the radiance $L'_{c,\lambda}$ of the object to be heated 30 by the first radiance meter 20, measuring the radiances $L'_{c,\lambda 1}$ and $L'_{c,\lambda 2}$ of the object to be heated 30 at the two wavelengths, i.e., the wavelengths $\lambda_1$ and $\lambda_2$ in advance enables deriving the following Expression (12) based on Expression (10).

[Expression 14]

$$\frac{L_{c,\lambda 1}}{L_{c,\lambda 2}} = \frac{\varepsilon_{c,\lambda 2}}{\varepsilon_{c,\lambda 1}} \frac{\dfrac{L'_{c,\lambda 1} - \dfrac{Q_{abs,\lambda 1} L_{d,\lambda 1}}{Q_{abs,\lambda 1} + Q_{sca,\lambda 1}}}{\exp\{-(Q_{abs,\lambda 1} + Q_{sca,\lambda 1})A_p N s_c\}} + \dfrac{Q_{abs,\lambda 1} L_{d,\lambda 1}}{Q_{abs,\lambda 1} + Q_{sca,\lambda 1}}}{\dfrac{L'_{c,\lambda 2} - \dfrac{Q_{abs,\lambda 2} L_{d,\lambda 2}}{Q_{abs,\lambda 2} + Q_{sca,\lambda 2}}}{\exp\{-(Q_{abs,\lambda 2} + Q_{sca,\lambda 2})A_p N s_c\}} + \dfrac{Q_{abs,\lambda 2} L_{d,\lambda 2}}{Q_{abs,\lambda 2} + Q_{sca,\lambda 2}}} \quad (12)$$

Consequently, a radiance ratio ($L_{c,\lambda 1}/L_{c,\lambda 2}$) of the object to be heated 30 can be obtained from an emissivity ratio ($\varepsilon_{c,\lambda 1}/\varepsilon_{c,\lambda 2}$) of the object to be heated without directly providing emissivities $\varepsilon_{c,\lambda 1}$ and $\varepsilon_{c,\lambda 2}$ of the object to be heated 30, and a temperature $T_c$ of the object to be heated 30 can be obtained from Expression (6). In general, when the wavelengths $\lambda_1$ and $\lambda_2$ are close to each other, the emissivity ratio ($\varepsilon_{c,\lambda 1}/\varepsilon_{c,\lambda 2}$) can be regarded as 1. Further, when the radiance $L'_{c,\lambda}$ of the object to be heated 30 is measured at the two wavelengths in advance, it is possible to suppress the effect that a flame of the burner 16 or radiation light emitted from the inner wall of the kiln hood 12 is reflected on the object to be heated 30 and enters the first radiance meter 20, and improve an accuracy of temperature measurement. Likewise, in a case where the radiance $L'_{c,\lambda}$ of the object to be heated 30 is measured at the two wavelengths in advance, it is possible to suppress the effect of an error in the radiance $L_{d,\lambda}$ of the dust or $A_p \cdot N$ which is caused when the radiation light emitted from the burner 16 or the inner wall of the kiln hood 12 is reflected on the wall surface in the furnace facing the second radiance meter 40 or scattered by the dust itself and enters the second radiance meter and which is calculated from a measurement value of the second radiance meter 40. That is because the effect of various factors can be reduced since the calculation is made with the use of the ratio rather than an absolute value of the radiance when the radiance $L'_{c,\lambda}$ of the object to be heated 30 is measured at the two wavelengths. Here, as the wavelengths $\lambda$ at the time of measuring the radiance $L'_{c,\lambda}$ of the object to be heated 30 with the use of the first radiance meter 20, using $\lambda_1$ and $\lambda_2$ at the time of measuring the radiance $L'_{d,\lambda}$ of the dust by the second radiance meter 40 is simple and hence desirable, but combinations of other wavelengths, e.g., wavelengths $\lambda_4$ and $\lambda_5$, wavelengths $\lambda_1$ and $\lambda_5$ as well as wavelengths $\lambda_4$ and $\lambda_2$ can suffice as long as the absorption coefficient $a_{p,\lambda}$ of the dust and the scattering coefficient $\sigma_{p,\lambda}$ of the dust can be additionally obtained. In case of the wavelengths $\lambda_4$ and $\lambda_5$, the radiances $L_{d,\lambda 1}$ and $L_{d,\lambda 2}$ of the dust which are substituted in Expression (12) could be replaced with the radiances $L_{d,\lambda 4}$ and $L_{d,\lambda 5}$ obtained with the use of the wavelength $\lambda_4$ and the wavelength $\lambda_5$ in Expression (2) at $T_d$, and substituted.

In the measuring method according to the first embodiment of the present invention, the temperature $T_c$ of the clinker which is the object to be heated can be obtained in the furnace having the dust therein like a rotary kiln in the cement production equipment. It is to be noted that the temperature $T_c$ of the clinker, the dust temperature $T_d$, dust concentration $C_d$, and others may be manually calculated from the measured radiances $L'_{c,\lambda}$ and $L'_{d,\lambda}$, but they may be automatically calculated by, e.g., calculating means such as a program of a computer 21 connected to outputs of the first radiance meter 20 and the second radiance meter 40.

<Second Embodiment>

A measuring method according to a second embodiment of the present invention will now be described. As regards this measuring method according to the second embodiment, like the first embodiment, a description will be given as to an example where a temperature of an object to be heated (a clinker) which is in a high-temperature state is measured in a rotary kiln having dust therein provided in a cement production equipment.

In the measuring method according to the second embodiment, as radiances of the dust used in the measurement of a temperature of the object to be heated in the first embodiment, two or more radiances measured by a plurality of second radiance meters are used. In an area of dust presence in a furnace in the cement production equipment or the like, it cannot be said that a dust temperature, dust concentration, and others are always constant depending on situations or the like. Thus, in this second embodiment, the area of dust presence is divided into two or more, and a plurality of radiances of dust in the respective divided areas are used, thereby further stabilizing a measurement accuracy.

<Apparatus>

A cement production equipment 10b used in the second embodiment is the same as the cement production equipment 10a used in the first embodiment in a side elevation (FIG. 3). On the other hand, a top view of the cement production equipment 10b used in this second embodiment is shown in FIG. 2.

Figure 2:
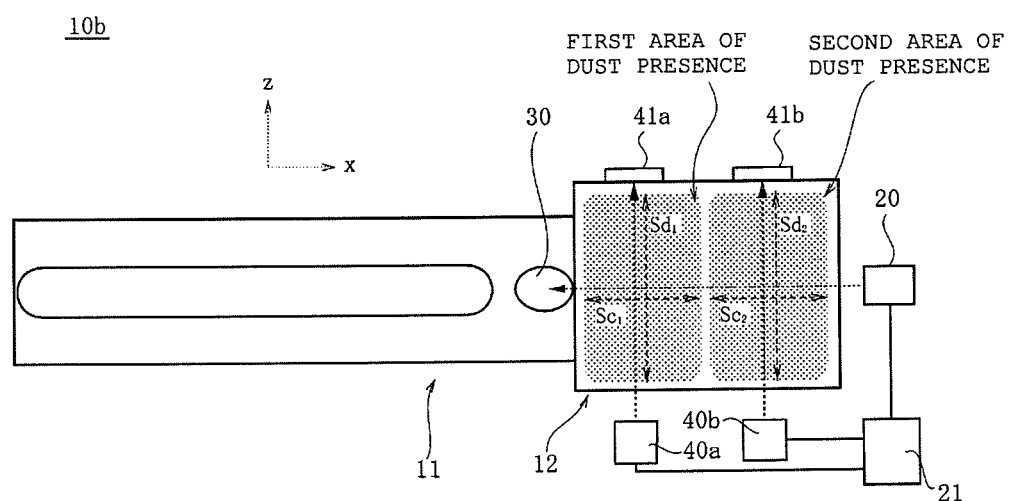
FIG. 2 is a top view schematically showing an outline of a cement production equipment used in a second embodiment according to the present invention.

As shown in FIG. 2 and FIG. 3, in this cement production equipment 10b, like the cement equipment 10a used in the first embodiment, a first radiance meter 20 which measures a radiance of an object to be measured 30 is provided on an outer side of a wall surface of a kiln hood 12 facing an end portion of a kiln shell 11a on the downstream side and at a position facing an object to be heated 30. That is, the first radiance meter 20 is provided so that the object to be heated 30 is present on an optical axis of the first radiance meter 20.

On the other hand, as shown in FIG. 2, a plurality of second radiance meters 40a and 40b which are configured to measure two or more radiances of dust present between the object to be measured 30 and the first radiance meter 20 are provided on the outer side of a side wall surface of the kiln hood 12, i.e., positions which do not face the object to be heated 30. That is, as regards a positional relationship between the first radiance meter 20 and the second radiance meters 40a and 40b, the second radiance meters 40a and 40b are provided at positions where optical axes of the second radiance meters 40a and 40b at least do not become parallel to, e.g., an optical axis of the first radiance meter 20 for the above-described reason. Although FIG. 2 shows an example where the two second radiance meters 40a and 40b are provided, the second radiance meters are provided in correspondence with the number of areas of dust presence divided at the time of carrying out the measuring method according to the present invention.

It is desirable to set positions at which the plurality of second radiance meters 40a and 40b are installed in a height direction y to positions at which the optical axes of the second radiance meters 40a and 40b cross the optical axis of the first radiance meter 20. Furthermore, it is desirable to set positions in a lateral direction x (an optical axis direction of the first radiance meter 20) to positions at which the optical axes of the second radiance meters 40a and 40b run through intermediate points ($S_{c1}/2$ and $S_{c2}/2$) in the respective divided areas of dust presence in the lateral direction x (the optical axis direction of the first radiance meter 20). Consequently, since an average dust temperature and dust concentration in the areas of dust presence can be reflected in the measurement of a temperature of the object to be heated, a measurement accuracy can be further improved.

Moreover, it is desirable to likewise configure this cement production equipment 10b so that its wall surface facing the second radiance meters 40a and 40b (a wall surface on the optical axes of the second radiance meters 40a and 40b) is held at a temperature lower than that of a surrounding wall surface by cooling means 41a and 41b provided as shown in FIG. 4 (a) and FIG. 4 (b). It is preferable to reduce the temperature of the wall surface to a temperature of 300 to 500° C. Additionally, it is desirable to control an emissivity of the wall surface facing the second radiance meters 40a and 40b to an emissivity much higher than 0.9 by using a material having an emissivity of 0.9 or more or providing such a blackbody cavity as shown in FIG. 5(a) or FIG. 5(b) like the first embodiment.

<Measurement of Radiance of Dust Present Between Object to be Heated and Radiance Meter>

In the measuring method according to the second embodiment of the present invention, radiances $L'_{d1,\lambda}$ and $L'_{d2,\lambda}$ of the dust at a wavelength λ are first measured by the plurality of second radiance meters 40a and 40b provided in the cement production meter 10b, respectively. Considering self-absorption and self-scattering due to the dust, the radiances $L'_{d1,\lambda}$ and $L'_{d1,\lambda}$ of the dust measured by the plurality of second radiance meters 40a and 40b are represented by the following Expression (13) and Expression (14), respectively.

[Expression 15]

$$L'_{d1,\lambda} = \frac{a_{p1,\lambda}L_{d1,\lambda}}{a_{p1,\lambda} + \sigma_{p1,\lambda}}[1 - \exp\{-(a_{p1,\lambda} + \sigma_{p1,\lambda})s_{d1}\}] \quad (13)$$

[Expression 16]

$$L'_{d2,\lambda} = \frac{a_{p2,\lambda}L_{d2,\lambda}}{a_{p2,\lambda} + \sigma_{p2,\lambda}}[1 - \exp\{-(a_{p2,\lambda} + \sigma_{p2,\lambda})s_{d2}\}] \quad (14)$$

In Expression (13) and Expression (14), $L'_{d1,\lambda}$ and $L'_{d2,\lambda}$ are radiances of dust in first and second areas of dust presence respectively, $a_{p1,\lambda}$ and $a_{p2,\lambda}$ are absorption coefficients of dust in the first and second areas of dust presence respectively, $\sigma_{p1,\lambda}$ and $\sigma_{p2,\lambda}$ are scattering coefficients of dust in the first and second areas of dust presence respectively, and $s_{d1}$ and $s_{d2}$ are lengths of the second radiance meters 40a and 40b in the optical axis direction in the first and second areas of dust presence respectively.

It is to be noted that the radiances $L_{d1,\lambda}$ and $L_{d2,\lambda}$ of the dust are obtained from dust temperatures $T_{d1}$ and $T_{d2}$ based on Planck's formula of Expression (2) respectively, and the absorption coefficients $a_{p1,\lambda}$ and $a_{p2,\lambda}$ of the dust and the scattering coefficients $\sigma_{p1,\lambda}$ and $\sigma_{p2,\lambda}$ of the dust are represented by Expression (3) and Expression (4) respectively.

Further, substituting Expression (3) and Expression (4) in Expression (13) and Expression (14) respectively enables acquiring two expressions corresponding to Expression (1') in the first embodiment. Furthermore, on the basis of these expressions, it is possible to acquire expressions corresponding to Expression (5) in the first embodiment, which are the following Expression (15) and Expression (16) representing respective ratios ($L'_{d1,\lambda1}/L'_{d1,\lambda2}$ and $L'_{d2,\lambda1}/L'_{d2,\lambda2}$) of the radiances $L'_{d1,\lambda1}$ and $L'_{d1,\lambda2}$, and $L'_{d2,\lambda1}$ and $L'_{d2,\lambda2}$ of the dust measured at two wavelengths, i.e., wavelengths $\lambda_1$ and $\lambda_2$ by the second radiance meters 40a and 40b respectively.

[Expression 17]

$$\frac{L'_{d1,\lambda1}}{L'_{d1,\lambda2}} \approx \frac{\xi_{1,\lambda1} L_{d1,\lambda1}}{\xi_{1,\lambda2} L_{d1,\lambda2}} \quad (15)$$

[Expression 18]

$$\frac{L'_{d2,\lambda1}}{L'_{d2,\lambda2}} \approx \frac{\xi_{2,\lambda1} L_{d2,\lambda1}}{\xi_{2,\lambda2} L_{d2,\lambda2}} \quad (16)$$

On the basis of Expression (15) and Expression (16), respective ratios ($L_{d1,\lambda1}/L_{d1,\lambda2}$ and $L_{d2,\lambda1}/L_{d2,\lambda2}$) of the radiances $L_{d1,\lambda1}$ and $L_{d2,\lambda2}$, and $L_{d2,\lambda1}$ and $L_{d2,\lambda2}$ of the dust are obtained from ratios ($\xi_{1,\lambda1}/\xi_{1,\lambda2}$ and $\xi_{2,\lambda1}/\xi_{2,\lambda2}$) of emissivities of dust particles at the wavelength $\lambda_1$ and the wavelength $\lambda_2$ in the first and second dust areas respectively.

Moreover, values of $L_{d1,\lambda1}/L_{d1,\lambda2}$ and $L_{d2,\lambda1}/L_{d2,\lambda2}$ are substituted in Expression (6) to obtain dust temperatures $T_{d1}$ and $T_{d2}$, respectively.

Subsequently, the radiances $L_{d1,\lambda1}$ and $L_{d2,\lambda1}$, and $L_{d1,\lambda2}$ and $L_{d2,\lambda2}$ of the dust at the wavelength $\lambda_1$ and the wavelength $\lambda_2$ can be obtained with the use of the dust temperatures $T_{d1}$ and $T_{d2}$ on the basis of Expression (2), respectively.

Further, when either the radiance $L_{d1,\lambda1}$ or $L_{d1,\lambda2}$ is substituted in the following Expression (17) and either the radiance $L_{d2,\lambda1}$ or $L_{d2,\lambda2}$ is substituted in the following Expression (18), $A_{p1} \cdot N_1$ and $A_{p2} \cdot N_2$ can be obtained, respectively. It is to be noted that an average value of $A_{p1} \cdot N_1$ obtained by substituting the radiances $L_{d1,\lambda1}$ and $L_{d1,\lambda2}$ in Expression (17) respectively may be used. This can be likewise applied to the calculation of $A_{p2} \cdot N_2$.

[Expression 19]

$$A_{p1} \cdot N_1 = \frac{\ln\left(1 - \frac{L'_{d1,\lambda}}{L_{d1,\lambda}} \frac{Q_{abs1,\lambda} + Q_{sca1,\lambda}}{Q_{abs1,\lambda}}\right)}{(Q_{abs1,\lambda} + Q_{sca1,\lambda})S_{d1}} \quad (17)$$

[Expression 20]

$$A_{p2} \cdot N_2 = \frac{\ln\left(1 - \frac{L'_{d2,\lambda}}{L_{d2,\lambda}} \frac{Q_{abs2,\lambda} + Q_{sca2,\lambda}}{Q_{abs2,\lambda}}\right)}{(Q_{abs2,\lambda} + Q_{sca2,\lambda})S_{d2}} \quad (18)$$

Further, since $A_{p1}$ and $A_{p2}$ are obtained by giving radii $r_{p1}$ and $r_{p2}$ of the dust particles, $N_1$ and $N_2$ are acquired, and dust concentrations $C_{d1}$ and $C_{d2}$ are obtained from the following Expression (19) and Expression (20) corresponding to Expression (8). It is to be noted that, when the radii $r_{p1}$ and $r_{p2}$ of the dust particles are unknown or vary depending on situations, the accurate radii $r_{p1}$ and $r_{p2}$ of the dust particles cannot be given, and the accurate dust concentrations $C_{d1}$ and $C_{d2}$ cannot be obtained, but a measurement value of a temperature of an object to be heated or a temperature of the dust which is a target in this method is not affected, and $A_{p1} \cdot N_1$ and $A_{p2} \cdot N_2$ can be considered to correspond to a load of the dust and can be exploited for control over the furnace or the like.

[Expression 21]

$$C_{d1} = N_1 \frac{273.15}{T_{g1}} \frac{4}{3} \pi r_{p1}^3 \rho_1 \quad (19)$$

[Expression 22]

$$C_{d2} = N_2 \frac{273.15}{T_{g2}} \frac{4}{3} \pi r_{p2}^3 \rho_2 \quad (20)$$

In Expression (19) and Expression (20), $T_{g1}$ and $T_{g2}$ are gas temperatures (K) in the first and second areas of dust presence, and $\rho_1$ and $\rho_2$ are densities of the dust particles in the first and second areas of dust presence, respectively. It is to be noted that a combination of wavelengths at the time of measuring the radiances $L'_{d1,\lambda}$ and $L'_{d2,\lambda}$ of the dust by the second radiance meters 40a and 40b may differ depending on the second radiance meters 40a and 40b and, for example, wavelengths $\lambda_1$ and $\lambda_7$, or wavelengths $\lambda_6$ and $\lambda_2$ as well as wavelengths $\lambda_6$ and $\lambda_7$ may be used in the measurement using the second radiance meter 40b.

<Measurement of Radiance and Temperature of Object to be Heated in Presence of Dust>

Aside from the measurement of the radiances $L'_{d1,\lambda}$ and $L'_{d2,\lambda}$ of the dust by the second radiance meters 40a and 40b, a radiance $L'_{c2,\lambda}$ of the object to be heated 30 at the wavelength $\lambda_1$ or $\lambda_2$ is measured by the first radiance meter 20. Considering attenuation due to absorption and scattering of the dust in the first and second areas of dust presence and a radiance from the dust, the radiance $L'_{c2,\lambda}$ measured by the first radiance meter 20 is represented by the following Expression (21). A first term on the right side in the following Expression (21) represents a radiance $L'_{c1,\lambda}$ from the object to be heated after passing through the first dust area represented by the following Expression (22) while taking the attenuation due to absorption and scattering of the dust in the second area of dust presence into consideration. Furthermore, a second term on the right side in the following Expression (21) represents a radiance from the dust in the second area of dust presence while taking self-absorption and self-scattering due to the dust into consideration. Moreover, a first term on the right side in the following expression (22) represents a radiance from the object to be heated while taking the attenuation due to absorption and scattering of the dust in the first dust area into consideration, and a second term on the right side represents a radiance from the dust in the first area of dust presence while taking self-absorption and self-scattering due to the dust into consideration.

[Expression 23]

$$L'_{c2,\lambda} = L'_{c1,\lambda} \exp\{-(a_{p2,\lambda} + \sigma_{p2,\lambda})s_{c2}\} + \frac{a_{p2,\lambda} L_{d2,\lambda}}{a_{p2,\lambda} + \sigma_{p2,\lambda}}[1 - \exp\{-(a_{p2,\lambda} + \sigma_{p2,\lambda})s_{c2}\}] \quad (21)$$

In Expression (21), $L_{d2,\lambda}$ is a radiance of the dust in the second area of dust presence, and $s_{c2}$ is a length of the first radiance meter 20 in the optical axis direction in the second area of dust presence. Furthermore, $a_{p2,\lambda}$ is an absorption coefficient of the dust in the second area of dust presence, and $\sigma_{p2,\lambda}$ is a scattering coefficient of the dust in the second area of dust presence.

[Expression 24]

$$L'_{c1,\lambda} = \varepsilon_{c,\lambda} L_{c,\lambda} \exp\{-(a_{p1,\lambda} + \sigma_{p1,\lambda})s_{c1}\} + \frac{a_{p1,\lambda} L_{d1,\lambda}}{a_{p1,\lambda} + \sigma_{p1,\lambda}}[1 - \exp\{-(a_{p1,\lambda} + \sigma_{p1,\lambda})s_{c1}\}] \quad (22)$$

In Expression (22), $\epsilon_{c,\lambda}$ is an emissivity of the object to be heated 30, $L_{c,\lambda}$ is a radiance of the object to be heated 30, $L_{d1,\lambda}$ is a radiance of the dust in the first area of dust presence, and $S_{c1}$ is a length of the first radiance meter 20 in the optical axis direction in the first area of dust presence. Further, $a_{p1,\lambda}$ is an absorption coefficient of the dust in the first area of dust presence, and $\sigma_{p1,\lambda}$ is a scattering coefficient of the dust in the first area of dust presence.

Additionally, in Expressions (21) and (22), the radiances $L_{d1,\lambda}$ and $L_{d2,\lambda}$ of the dust and the radiance $L_{c,\lambda}$ of the object to be heated are obtained from the dust temperatures $T_{d1}$ and $T_{d2}$ and the temperature $T_c$ of the object to be heated on the bases of Planck's formula of Expression (2), and the absorption coefficients $a_{p1,\lambda}$ and $a_{p2,\lambda}$ and the scattering coefficients $\sigma_{p1,\lambda}$ and $\sigma_{p2,\lambda}$ of the dust are represented by Expression (3) and Expression (4), respectively.

Here, the following Expression (23) represents an expression which obtains the radiance $L'_{c1,\lambda}$ from the object to be heated after passing through the first area of dust presence from the radiance $L'_{c2,\lambda}$ of the object to be heated 30 measured by the first radiance meter 20 by substituting Expression (3) and Expression (4) in Expression (21).

[Expression 25]

$$L'_{c1,\lambda} = \frac{L'_{c2,\lambda} - \frac{Q_{abs2,\lambda}L_{d2,\lambda}}{Q_{abs2,\lambda}+Q_{sca2,\lambda}}}{\exp\{-(Q_{abs2,\lambda}+Q_{sca2,\lambda})A_{p2}N_2 S_{c2}\}} + \frac{Q_{abs2,\lambda}L_{d2,\lambda}}{Q_{abs2,\lambda}+Q_{sca2,\lambda}} \quad (23)$$

Further, $T_{d2}$ is obtained from the radiance $L'_{c2,\lambda}$ of the object to be heated 30 measured at the wavelength $\lambda_1$ or the wavelength $\lambda_2$ by the first radiance meter 20 and the radiances $L'_{d2,\lambda1}$ and $L'_{d2,\lambda2}$ of the dust measured by the second radiance meter 40b on the basis of Expression (16) and Expression (6), and $L'_{c1,\lambda}$ is obtained by substituting the radiance $L_{d2,\lambda}$ of the dust at the wavelength $\lambda_1$ or the wavelength $\lambda_2$ used for the measurement of the first radiance meter 20 and $A_{p2} \cdot N_2$ obtained from Expression (18) in Expression (23).

Furthermore, the following Expression (24) represents an expression which obtains the radiance $L_{c,\lambda}$ of the object to be heated 30 by substituting Expression (3) and Expression (4) in Expression (22) and modifying it. $T_{d1}$ is obtained from the acquired $L'_{c1,\lambda}$ and the radiances $L'_{d1,\lambda1}$ and $L'_{d1,\lambda2}$ of the dust measured by the second radiance meter 40a on the basis of Expression (15) and Expression (6), and the radiance $L_{d1,\lambda}$ of the dust at the wavelength $\lambda_1$ or the wavelength $\lambda_2$ obtained from Expression (2) and used for the measurement of the first radiance meter 20 and $A_{p1} \cdot N_1$ obtained from Expression (17) are substituted, thereby acquiring the radiance $L_{c,\lambda}$ of the object to be heated 30. It is to be noted that, as the wavelength at which the radiance $L'_{c2,\lambda}$ of the object to be heated 30 is measured, using either the wavelength $\lambda_1$ or $\lambda_2$ at the time of measuring the radiances $L'_{d1,\lambda}$ and $L'_{d2,\lambda}$ of the dust by the second radiance meters 40a and 40b is simple and desirable, but any other wavelength $\lambda_8$ may be used as long as the absorption coefficient $a_{p,\lambda}$ of the dust and the scattering coefficient $\sigma_{p,\lambda}$ of the dust can be additionally obtained. In this case, the radiance $L_{d2,\lambda}$ of the dust which is substituted in Expression (23) can be obtained by using $T_{d2}$ and the wavelength $\lambda_8$ in Expression (2), and the radiance $L_{d1,\lambda}$ of the dust which is substituted in Expression (24) can be obtained by using $T_{d2}$ and the wavelength $\lambda_8$ in Expression (2).

[Expression 26]

$$L_{c,\lambda} = \frac{1}{\varepsilon_{c,\lambda}}\left[\frac{L'_{c1,\lambda} - \frac{Q_{abs1,\lambda}L_{d1,\lambda}}{Q_{abs1,\lambda}+Q_{sca1,\lambda}}}{\exp\{-(Q_{abs1,\lambda}+Q_{sca1,\lambda})A_{p1}N_1 S_{c1}\}} + \frac{Q_{abs1,\lambda}L_{d1,\lambda}}{Q_{abs1,\lambda}+Q_{sca1,\lambda}}\right] \quad (24)$$

Moreover, when the radiance $L_{c,\lambda}$ of the object to be heated 30 is substituted in Expression (11), the temperature $T_c$ of the object to be heated 30 can be obtained.

It is to be noted that, at the time of measuring the radiance $L'_{c2,\lambda}$ of the object to be heated 30 by using the first radiance meter 20, measuring the radiances $L'_{c2,\lambda1}$ and $L'_{c2,\lambda2}$ of the object to be heated 30 at two wavelengths, i.e., the wavelengths $\lambda_1$ and $\lambda_2$ in advance enables obtaining $L'_{c1,\lambda1}$ and $L'_{c1,\lambda2}$ from Expression (23), and further the following Expression (25) is derived from Expression (24).

[Expression 27]

$$\frac{L_{c,\lambda1}}{L_{c,\lambda2}} = \frac{\varepsilon_{c,\lambda2}}{\varepsilon_{c,\lambda1}} \frac{\frac{L'_{c1,\lambda1} - \frac{Q_{abs1,\lambda1}L_{d1,\lambda1}}{Q_{abs1,\lambda1}+Q_{sca1,\lambda1}}}{\exp\{-(Q_{abs1,\lambda1}+Q_{sca1,\lambda1})A_{p1}N_1 S_{c1}\}} + \frac{Q_{abs1,\lambda1}L_{d1,\lambda1}}{Q_{abs1,\lambda1}+Q_{sca1,\lambda1}}}{\frac{L'_{c1,\lambda2} - \frac{Q_{abs1,\lambda2}L_{d1,\lambda2}}{Q_{abs1,\lambda2}+Q_{sca1,\lambda2}}}{\exp\{-(Q_{abs1,\lambda2}+Q_{sca1,\lambda2})A_{p1}N_1 S_{c1}\}} + \frac{Q_{abs1,\lambda2}L_{d1,\lambda2}}{Q_{abs1,\lambda2}+Q_{sca1,\lambda2}}} \quad (25)$$

Consequently, a radiance ratio ($L_{c,\lambda1}/L_{c,\lambda2}$) of the object to be heated 30 can be obtained from an emissivity ratio ($\epsilon_{c,\lambda1}/\epsilon_{c,\lambda2}$) of the object to be heated 30 without directly giving emissivities $\epsilon_{c,\lambda1}$ and $\epsilon_{c,\lambda2}$ of the object to be heated 30, and the temperature $T_c$ of the object to be heated 30 can be acquired from Expression (6). In general, when the wavelengths $\lambda_1$ and $\lambda_2$ are close to each other, the emissivity ratio ($\epsilon_{c,\lambda1}/\epsilon_{c,\lambda2}$) can be considered as 1. Further, when the radiance $L'_{c2,\lambda}$ of object to be heated 30 is measured at two wavelengths in advance, the effect that a flame of the burner 16 or radiation light emitted from the inner wall of the kiln hood 12 is reflected on the object to be heated 30 and enters the first radiance meter 20 can be suppressed, and an accuracy of the temperature measurement can be improved. Likewise, when the radiance $L'_{c2,\lambda}$ of the object to be heated 30 is measured at two wavelengths in advance, it is possible to suppress the effect of an error in the radiance $L_{d,\lambda}$ or $A_p N$ of the dust calculated from a measurement value of the second radiance meter 40, which is caused when the radiation light emitted from the burner 16 or the inner wall of the kiln hood 12 is reflected on the wall surface in the furnace facing the second radiance meters 40a and 40b or scattered by the dust itself. Here, as the wavelengths $\lambda$ at the time of measuring the radiance $L'_{c2,\lambda}$ of the object to be heated 30 by using the first radiance meter 20, using $\lambda_1$ and $\lambda_2$ at the time of measuring the radiances $L'_{d1,\lambda}$ and $L'_{d2,\lambda}$ of the dust is simple and desirable, but combinations of other wavelengths, e.g., wavelengths $\lambda_1$ and $\lambda_{10}$, wavelengths $\lambda_9$ and $\lambda_2$ as well as wavelengths $\lambda_9$ and $\lambda_{10}$ can suffice as long as the absorption coefficient $a_{p,\lambda}$ of the dust and the scattering coefficient $\sigma_{p,\lambda}$ of the dust can be additionally obtained. In case of the wavelengths $\lambda_9$ and $\lambda_{10}$, $L_{d2,\lambda}$ which is substituted in Expression (23) is calculated from $T_{d2}$ at the wavelength $\lambda_9$ and the wavelength $\lambda_{10}$ and substituted on the basis of Expression (2), and the radiance $L_{d1,\lambda 1}$ and $L_{d1,\lambda 2}$ of the dust which are substituted in Expression (25) could be replaced with the radiances $L_{d1,\lambda 9}$ and $L_{d1,\lambda 10}$ obtained with the use of the wavelength $\lambda_9$ and the wavelength $\lambda_{10}$ from $T_{d1}$ and substituted on the basis of Expression (2).

As described above, in the measuring method according to the second embodiment of the present invention, the temperature $T_c$ of the clinker which is the object to be heated can be obtained in the furnace having the dust therein like a rotary kiln in the cement production equipment. In the measuring method according to the second embodiment of the present invention, even if a bias of a distribution of a dust temperature, dust concentration, a radius of each dust particle, or the like in the area of dust presence in the furnace is considerable in particular, a measurement accuracy can be improved. It is to be noted that the temperature $T_c$ of the clinker, the dust temperatures $T_{d1}$ and $T_{d2}$, dust concentrations $C_{d1}$ and $C_{d2}$, and others may be manually calculated from the measured radiances $L'_{c,\lambda}$, $L'_{d1,\lambda}$, and $L'_{d2,\lambda}$, but they may be automatically calculated by, e.g., calculating means such as a program of a computer 21 connected to outputs of the first radiance meter 20 and the second radiance meters 40a and 40b.

Further, although the description has been given as to the example where a temperature of the object to be heated in the rotary kiln is measured in the first and second embodiments according to the present invention, the measuring method according to the present invention is not restricted to this example, and the temperature measuring method according to the present invention can be preferably used if it is an object in an atmosphere where dust is present. As examples other than the object to be heated, there are an object to be heated present in high-temperature furnaces (heating, smelting, refinement, firing, reactions, and others) other than a rotary kiln, a heat exchange tube in a boiler, and a solid or a liquid flowing through a duct as well as a heat transfer pipe or a partition wall in a heat exchanger. Furthermore, the object which is a temperature measurement target is not restricted to one having a high temperature above 1000° C. like a clinker, and it may be one having approximately hundreds ° C.

EXAMPLES

Examples and comparative examples of the present invention will now be described in detail hereinafter.

Example 1

Assuming that $\lambda_1$=0.9 μm, $\lambda_2$=1.35 μm, a temperature $T_c$ of an object to be heated=1450° C., an emissivity $\epsilon_{c,\lambda}$ of the object to be heated is 0.9 ($\lambda_1,\lambda_2$), a dust temperature $T_d$=1000° C., dust concentration $C_d$=100 g/m³$_N$ (N means that a temperature of a dust-containing gas is 0° C. and a pressure is an atmospheric pressure), a radius $r_p$ of a dust particle is 20 μm, an emissivity $\xi_\lambda$ of the dust particle is 0.9 ($\lambda_1$, $\lambda_2$), a length $s_d$ of an area of dust presence when a radiance of the dust is measured by the second radiance meter 40 is 5 m, a length $s_c$ of the area of dust presence when a radiance of the object to be heated 30 is measured by the first radiance meter 20 is 5 m, and density ρ of the dust particle is 3.18 g/cm³, when radiances $L'_{c,\lambda 1}$ and $L'_{c,\lambda 2}$ which are to be measured by the first radiance meter 20 are calculated at $\lambda_1$ and $\lambda_2$ from Expression (9), $L'_{c,\lambda 1}$=1.94×10⁹ and $L'_{c,\lambda 2}$=9.02×10⁹ are derived.

On the other hand, as shown in FIG. 1, cooling means 41 was provided, and a second radiance meter 40 was installed at a position facing a wall surface cooled to 300° C. by the cooling means 41. It is to be noted that the cooling means 41 was installed as shown in FIG. 4(b) by a method of providing a cylindrical concave portion which has an opening end in a wall surface and protrudes toward the outer side, and by winding a water cooled tube as the cooling means 41 on an outer periphery of the concave portion. Moreover, a cylinder length (a height) of the cylindrical concave portion was adjusted to provide a blackbody cavity, an emissivity of the wall surface was set to 0.999, and radiation light entered the blackbody cavity from a furnace inner wall surface of 1200° C. surrounding this cavity. Additionally, $L'_{d,\lambda 1}$ and $L'_{d,\lambda 2}$ at the time of measuring at the two wavelengths $\lambda_1$ and $\lambda_2$ are acquired by this second radiance meter 40, $L_{d,\lambda 1}/L_{d,\lambda 2}$ which is a radiance ratio of the dust is calculated from Expression (5), and a dust temperature $T_d$=1000° C. is obtained from Expression (6). Further, $A_p \cdot N$=0.2536 is obtained from Expression (7).

Then, these pieces of information are substituted in Expression (10) to obtain $L_{c,\lambda}$, and $T_c$=1451° C. can be obtained from Expression (11). It is to be noted that this result is a result of measuring the radiance $L'_{c,\lambda}$ of the object to be heated by a method of measuring at one wavelength (λ=0.9 μm).

Furthermore, these pieces of information are substituted in Expression (12) to obtain $L_{c,\lambda 1}/L_{c,\lambda 2}$, and $T_c$=1450° C. can be obtained from Expression (6). It is to be noted that this result is a result of measuring the radiance $L'_{c,\lambda}$ of the object to be heated by a method of measuring at two wavelengths (λ=0.9 μm, and $\lambda_2$=1.35 μm).

On the other hand, in case of performing the measurement based on a two-color method which is an existing technology using no second radiance meter 40, when a calculation is made on the basis of Expression (6) from a ratio of $L'_{c,\lambda 1}$=1.94×10⁹ and $L'_{c,\lambda 2}$=9.02×10⁹ which have been already obtained, $T_c$=1222° C. is provided. That is, a deviation from 1450° C. as the temperature of the object to be heated is 228° C. when the existing technology which does not adopt the second radiance meter 40 is used, whereas it is 1° C. when the method according to the present invention which measures the radiance $L'_c,\lambda$ of the object to be heated at one wavelength (λ=0.9 μm) is used, or it is 0° C. when the method according to the present invention which measures the radiance $L'_{c,\lambda}$ of the object to be heated at two wavelengths ($\lambda_1$=0.9 μm, and $\lambda_2$=1.35 μm) is used, and it can be understood that a very high accuracy is achieved.

Figure 6:
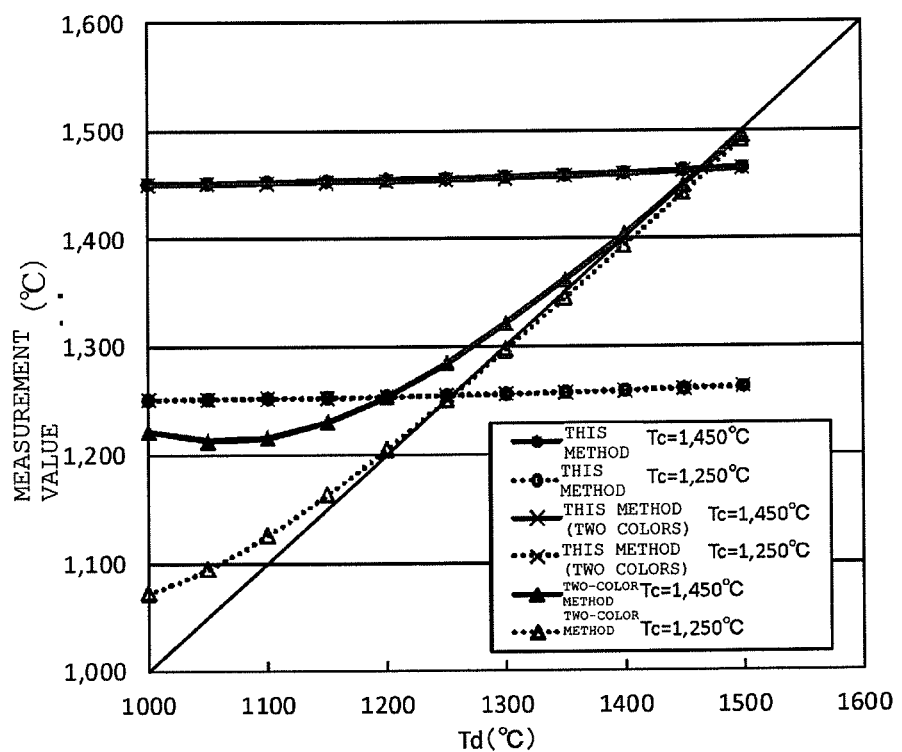
FIG. 6 is a graph showing transitions of measurement values involved in changes in a dust temperature $T_d$ in Example 1.

Further, FIG. 6 shows transitions of measurement values provided by the existing technology which does not use the second radiance meter 40, the measuring method for measuring the radiance $L'_{c,\lambda}$ of the object to be heated at one wavelength (λ=0.9, and the method for measuring the radiance $L'_{c,\lambda}$ of the object to be heated at two wavelengths ($\lambda_1$=0.9 μm, and $\lambda_2$=1.35 μm) respectively, which are brought about by a change in the dust temperature $T_d$ when other conditions remain the same and $T_c$=1450 or 1250° C. (the two-color method, this method, and this method (two colors) in FIG. 6). It can be understood that deviations become considerable as measurement values get closer to the dust temperature in the existing technology which is impractical, but accurate measurement values can be provided irrespective of the dust temperature in this method and this method (two colors).

Figure 7:
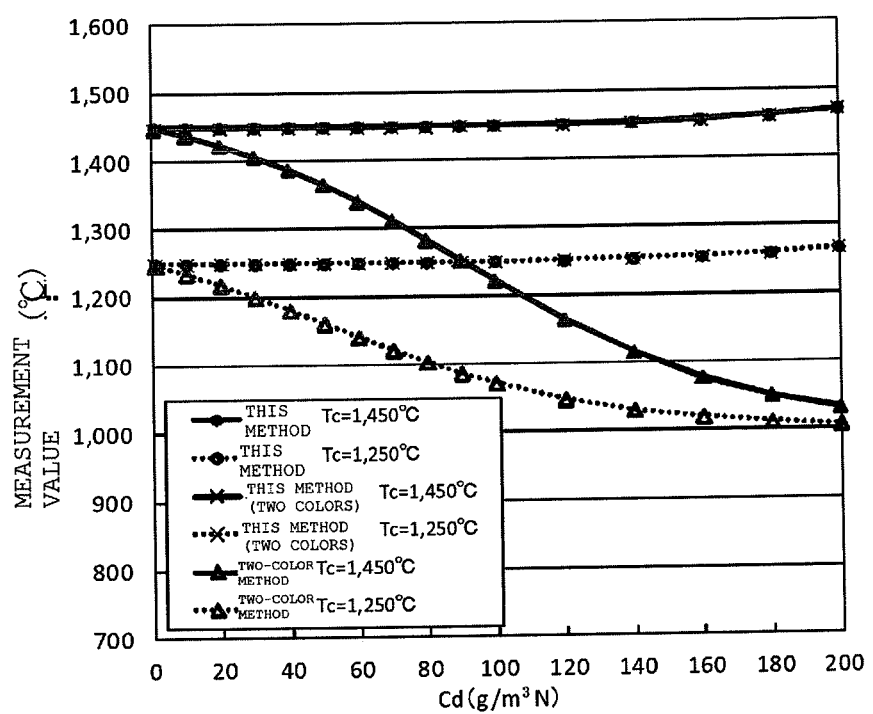
FIG. 7 is a graph showing transitions of measurement values involved in changes in dust concentration $C_d$ in Example

Furthermore, FIG. 7 shows transitions of measurement values provided by the existing technology which does not use the second radiance meter 40, the measuring method for measuring the radiance $L'_{c,\lambda}$ of the object to be heated at one wavelength (λ=0.9 μm), and the method for measuring the radiance $L'_{c,\lambda}$ of the object to be heated at two wavelengths ($\lambda_1$=0.9 μm, and $\lambda_2$=1.35 μm) respectively, which are brought about by a change in the dust concentration $C_d$ when other conditions remain the same and $T_c$=1450 or 1250° C. (the two-color method, this method, and this method (two colors) in FIG. 7). Although the existing technology is not affected when the dust concentration $C_d$ is small, a deviation increases when measurement values get closer to 1000° C. which is the dust temperature due to a rise of the dust concentration, and hence the existing technology is impractical, but the present method and the present method (two colors) are not greatly affected even though the dust concentration is high, and it can be understood that these methods have an accuracy far greater than that of the existing technology.

Moreover, Table 1 shows a measurement result of temperatures of the object to be heated when an emissivity of a wall surface facing the second radiance meter 40 was changed when other conditions remained the same to see an effect of the emissivity of the wall surface. Here, in Table 1, an emissivity 0.7 shows a case where the facing wall surface was made of a refractory and measurement was performed, and an emissivity 0.9 shows a case where a blackbody coating was further applied to the wall surface made of the refractory and measurement was performed. It is to be noted that an emissivity 0.999 corresponds to a result of providing the blackbody cavity and performing measurement. Additionally, each numerical value in parentheses represents a deviation from 1450° C. which is the temperature of the object to be heated. Further, a temperature of the wall surface facing the second radiance meter 40 was cooled to 300° C. by the cooling means 41.

TABLE 1

| | Emissivity of facing wall surface | | |
| --- | --- | --- | --- |
| | 0.7 | 0.9 | 0.999 |
| This method | 1377 (−73) | 1419 (−31) | 1451 (+1) |
| This method (two colors) | 1480 (+30) | 1459 (+9) | 1450 (0) |
| Two-color method (existing technology) | 1222 (−228) | 1222 (−228) | 1222 (−228) |

When the emissivity is 0.7, deviations in this method and this method (two colors) are as large as −73° C. and 30° C. respectively, but they are smaller than −228° C. which is a deviation in the two-color method (the existing technology). Further, when the emissivity is 0.9, deviations in this method and this method (two colors) are −31° C. and 9° C. respectively, and hence the deviations can be reduced. Furthermore, as to each emissivity, it can be understood that the deviations of this method (two colors) are smaller than those of this method and the method for measuring the radiance $L'_c$ of the object to be heated at two wavelengths can greatly improve an accuracy.

Example 2

Assuming that $\lambda_1$=0.9 μm, $\lambda_2$=1.35 μm, a temperature $T_c$ of an object to be heated is 1450° C., an emissivity $\epsilon_{c,\lambda}$ of the object to be heated is 0.9 ($\lambda_1$, $\lambda_2$), dust temperatures $T_{d1}$=1000° C. and $T_{d2}$=900° C. in the first and second areas of dust presence respectively, dust concentration $C_{d1}$=$C_{d2}$=100 g/m³N, a radius $r_{p1}$ of a dust particle=$r_{p2}$=20 μm, an emissivity $\xi_{1,\lambda}$ of the dust particle is $\xi_{2,\lambda}$=0.9 ($\lambda_1$, $\lambda_2$) a length $s_{d1}$ of a first area of dust presence is 5 m and a length $s_{d2}$ of a second area of dust presence is 5 m when a radiance of the dust is measured by the second radiance meters 40a and 40b, a length $s_{c1}$ of the first area of dust presence is 3 m and a length $sc_2$ of the area of the second area of dust presence is 2 m when a radiance of the object to be heated 30 is measured by the first radiance meter 20, and density $\rho_1$ of the dust particles is $\rho_2$=3.18 g/cm³, when radiances $L'_{c2,\lambda1}$ and $L'_{c2,\lambda2}$ which are to be measured by the first radiance meter 20 are calculated at $\lambda_1$ and $\lambda_2$ from Expression (21) and Expression (22), $L'_{c2,\lambda1}$=1.67×10⁹ and $L'_{c2,\lambda2}$=7.23×10⁹ are derived.

On the other hand, as shown in FIG. 2, cooling means 41a and 41b were provided, and the second radiance meters 40a and 40b were installed at positions facing a wall surface cooled to 300° C. by the cooling means 41a and 41b. It is to be noted that both of the two cooling means 41a and 41b were installed as shown in FIG. 4(b) by a method of providing a cylindrical concave portion which has an opening end in a wall surface and protrudes toward the outer side, and by winding a water cooled tube as the cooling means 41a and 41b on an outer periphery of the concave portion. Moreover, the cylindrical concave portion was made to be a blackbody cavity by adjusting a cylinder length (a height), and an emissivity of the wall surface was set to 0.999. Additionally, $L'_{d1,\lambda1}$, $L'_{d1,\lambda2}$, $L'_{d2,\lambda1}$, and $L'_{d2,\lambda2}$ assuming the measurement at the two wavelengths $\lambda_1$ and $\lambda_2$ are acquired by the two second radiance meters 40a and 40b, $L_{d1,\lambda1}/L_{d1,\lambda2}$ and $L_{d2,\lambda1}/L_{d2,\lambda2}$ which are radiance ratios of the dust are calculated from Expression (15) and Expression (16), and dust temperatures $T_{d1}$=1000° C. and $T_{d2}$=900° C. are obtained from Expression (6). Further, $A_{p1}·N_1$=0.2536 and $A_{p2}·N_2$=0.2530 are obtained from Expression (17) and Expression (18). Then, these pieces of information are substituted in Expression (23) and Expression (24) to calculate $L_c,\lambda$, and $T_c$=1450° C. can be obtained from. Expression (11).

On the other hand, like this example, when lengths of the first and second areas of dust presence at the time of measuring the radiance of the object to be heated 30 by the first radiance meter 20 are $s_{c1}$=3 m and $s_{c2}$=2 m respectively and the dust temperatures are $T_{d1}$=1000° C. and $T_{d2}$=900° C. respectively, in case of measuring the radiance of the dust only at one position in the area of dust presence and at an intermediate point in the area of dust presence by the second radiance meter 40 like Example 1, the length of the area of dust presence in Example 1 is $s_c$=5 m (=$s_{c1}$+$s_{c2}$) and the dust temperature $T_{d1}$ at the same point is 1000° C. As shown in FIG. 1, the cooling means 41 was provided, and the second radiance meter 40 was installed at a position facing a wall surface cooled to 300° C. by the cooling means 41. It is to be noted that the cooling means 41 was installed as shown in FIG. 4(b) by a method of providing a cylindrical concave portion which has an opening end in a wall surface and protrudes toward the outer side, and by winding a water cooled tube as the cooling means 41 on an outer periphery of the concave portion. Moreover, the cylindrical concave portion was made to be a blackbody by adjusting a cylinder length (a height), and an emissivity of the wall surface was set to 0.999. Additionally, $L'_{d,\lambda1}$ and $L'_{d,\lambda2}$ at the time of measuring at the two wavelengths $\lambda_1$ and $\lambda_2$ are acquired by this second radiance meter 40, $L_{d,\lambda1}/L_{d,\lambda2}$ which is a radiance ratio of the dust is obtained from Expression (5), the dust temperature $T_d$=1000° C. is calculated from Expression (6), and $A_p·N$=0.2536 is calculated from Expression (7). However, the radiances $L'_{c,\lambda1}$ and $L'_{c,\lambda2}$ measured by the first radiance meter 20 is $L'_{c2,\lambda1}$=1.67×10⁹ and $L'_{c2,\lambda2}$=7.23×10⁹ obtained on the earlier stage, and these values are substituted in Expression (10) to obtain $L_{c,\lambda}$, and $T_c=1411°$ C. is calculated from Expression (11).

When the measurement was performed by the two-color method as the existing technology which does not use the second radiance meter 40, $T_c=1254°$ C. is derived from a ratio of $L'_{c2,\lambda 1}=1.67\times10^9$ and $L'_{c2,\lambda 2}=7.23\times10^9$ obtained on the earlier stage on the basis of a calculation using Expression (6). That is, deviations in the measurement performed at two positions in the area of dust presence and the measurement performed at one position in the same on the basis of this method and a deviation in the measurement on the basis of the existing technology (the two-color method) are 0° C., −39° C., and −196° C. respectively, and it has been revealed that this method has a higher accuracy than that of the existing technology and that, if the dust temperature, the dust concentration, the radius of the dust particle, and others have distributions in the area of dust presence, increasing the number of positions at which the radiance of dust is measured enables enhancing a temperature measurement accuracy.

INDUSTRIAL APPLICABILITY

The present invention can be preferably used in measurement of a temperature of an object to be heated like a clinker having a high-temperature mainly in a furnace having dust therein like a rotary kiln in a cement production equipment.

EXPLANATIONS OF LETTERS OR NUMERALS

10*a* cement production equipment
11 rotary kiln
20 first radiance meter
30 object (object to be heated or the like)
40 second radiance meter

The invention claimed is:

1. A method for measuring a temperature of an object, the method using a first radiance meter which is provided to face the object in an atmosphere where dust is present and measures a radiance of the object and a second radiance meter which is provided without facing the object and measures a radiance of the dust present between the object and the first radiance meter so that a temperature of the object is measured from the radiance of the object measured by the first radiance meter and the radiance of the dust present between the object and the first radiance meter measured by the second radiance meter.

2. The method for measuring a temperature of an object according to claim 1,
wherein the radiance of the dust is measured at two wavelengths.

3. The method for measuring a temperature of an object according to claim 2,
wherein, at the time of measuring the radiance of the dust, the measurement is performed in a state where a temperature of a wall surface facing the second radiance meter is lowered by cooling structure.

4. The method for measuring a temperature of an object according to claim 2,
wherein, at the time of measuring the radiance of the dust, an emissivity of a wall surface facing the second radiance meter is set to 0.9 or more.

5. The method for measuring a temperature of an object according to claim 2,
wherein the radiance of the object is measured at two wavelengths.

6. The method for measuring a temperature of an object according to claim 2,
wherein a plurality of radiance meters are used as the second radiance meter to measure two or more radiances of the dust, and the measurement is made from the radiance of the object measured by the first radiance meter and the two or more radiances of the dust present between the object and the first radiance meter measured by the plurality of second radiance meters.

7. The method for measuring a temperature of an object according to claim 1,
wherein, at the time of measuring the radiance of the dust, the measurement is performed in a state where a temperature of a wall surface facing the second radiance meter is lowered by cooling structure.

8. The method for measuring a temperature of an object according to claim 7,
wherein, at the time of measuring the radiance of the dust, an emissivity of the wall surface facing the second radiance meter is set to 0.9 or more.

9. The method for measuring a temperature of an object according to claim 7,
wherein the radiance of the object is measured at two wavelengths.

10. The method for measuring a temperature of an object according to claim 7,
wherein a plurality of radiance meters are used as the second radiance meter to measure two or more radiances of the dust, and the measurement is made from the radiance of the object measured by the first radiance meter and the two or more radiances of the dust present between the object and the first radiance meter measured by the plurality of second radiance meters.

11. The method for measuring a temperature of an object according to claim 1,
wherein, at the time of measuring the radiance of the dust, an emissivity of a wall surface facing the second radiance meter is set to 0.9 or more.

12. The method for measuring a temperature of an object according to claim 11,
wherein, at the time of measuring a radiance of the dust, a blackbody cavity is provided in the wall surface facing the second radiance meter.

13. The method for measuring a temperature of an object according to claim 12,
wherein the radiance of the object is measured at two wavelengths.

14. The method for measuring a temperature of an object according to claim 12,
wherein a plurality of radiance meters are used as the second radiance meter to measure two or more radiances of the dust, and the measurement is made from the radiance of the object measured by the first radiance meter and the two or more radiances of the dust present between the object and the first radiance meter measured by the plurality of second radiance meters.

15. The method for measuring a temperature of an object according to claim 11,
wherein the radiance of the object is measured at two wavelengths.

16. The method for measuring a temperature of an object according to claim 11,
wherein a plurality of radiance meters are used as the second radiance meter to measure two or more radiances of the dust, and the measurement is made from the radiance of the object measured by the first radiance meter and the two or more radiances of the dust present between the object and the first radiance meter measured by the plurality of second radiance meters.

17. The method for measuring a temperature of an object according to claim 1,
wherein the radiance of the object is measured at two wavelengths.

18. The method for measuring a temperature of an object according to claim 17,
wherein a plurality of radiance meters are used as the second radiance meter to measure two or more radiances of the dust, and the measurement is made from the radiance of the object measured by the first radiance meter and the two or more radiances of the dust present between the object and the first radiance meter measured by the plurality of second radiance meters.

19. The method for measuring a temperature of an object according to claim 1,
wherein a plurality of radiance meters are used as the second radiance meter to measure two or more radiances of the dust, and the measurement is made from the radiance of the object measured by the first radiance meter and the two or more radiances of the dust present between the object and the first radiance meter measured by the plurality of second radiance meters.

\* \* \* \* \*